United States Patent [19]

Van Assche

[11] 4,048,153

[45] Sept. 13, 1977

[54] AZO DYES HAVING AN OPTIONALLY SUBSTITUTED 1-AZO-3-NITRO-4-ARYLAMINOPHENYL NUCLEUS

[75] Inventor: Daniel Van Assche, Binningen, Switzerland

[73] Assignee: Sandoz Ltd., Basel, Switzerland

[21] Appl. No.: 528,357

[22] Filed: Nov. 29, 1974

Related U.S. Application Data

[63] Continuation of Ser. No. 253,411, May 15, 1972, abandoned.

[30] Foreign Application Priority Data

May 17, 1971   Switzerland .................... 7230/71

[51] Int. Cl.$^2$ ............... C09B 29/08; C09B 29/32; C09B 29/36; C09B 31/04
[52] U.S. Cl. .................. 260/193; 260/152; 260/153; 260/154; 260/156; 260/157; 260/158; 260/162; 260/163; 260/186; 260/187; 260/191; 260/196; 260/197; 260/205; 260/206; 260/207; 260/207.1
[58] Field of Search ............ 260/186, 187, 191, 193, 260/196, 197, 198, 199, 205, 206, 207, 207.1

[56] References Cited

U.S. PATENT DOCUMENTS

| | | | |
|---|---|---|---|
| 1,086,155 | 2/1914 | Geldermann et al. | 260/193 |
| 1,590,728 | 6/1926 | Dorrer | 260/205 |
| 2,177,427 | 10/1939 | Felix et al. | 260/206 |
| 2,879,269 | 3/1959 | Merian | 260/205 X |
| 3,502,646 | 3/1970 | Canonica et al. | 260/186 |
| 3,514,439 | 5/1970 | Wehrli et al. | 260/147 |
| 3,516,982 | 6/1970 | Dimroth et al. | 260/206 |
| 3,535,306 | 10/1970 | Altermatt et al. | 260/207.1 |
| 3,685,952 | 8/1972 | Renfrew | 260/205 X |
| 3,741,954 | 6/1973 | Altermatt | 260/205 |
| 3,759,892 | 9/1973 | Wicki | 260/145 C |
| 3,865,805 | 2/1975 | Altermatt | 260/205 |

OTHER PUBLICATIONS

Venratarman, "The Chemistry of Synthetic Dyes", vol. I, p. 270 (1952).

*Primary Examiner*—Floyd D. Higel
*Attorney, Agent, or Firm*—Gerald D. Sharkin; Richard E. Vila; Melvyn M. Kassenoff

[57] ABSTRACT

Water-soluble azo dyes of the formula

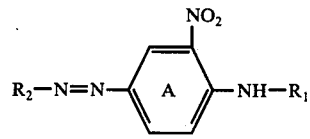

in which
   $R_1$ signifies an aromatic or heterocyclic radical which may be substituted,
   $R_2$ has one of the significances of 1 or is the radical of a coupling component, for example, a radical of a coupling component bearing an active methylene group,
   and the molecule contains 1 or 2 sulfo groups,
   and the ring A may be further substituted, and processes for their synthesis. These dyes are useful for the dyeing and printing of a variety of organic materials including natural and synthetic polyamide fibers, e.g., wool, and paper. The obtained dyeings and prints exhibit good fastness to light and wet treatments as well as to gas fumes and rubbing, and dyeings obtained in combination with blue dyes, for example blue cationic anthraquinone dyes, exhibit good resistance to catalytic fading.

25 Claims, No Drawings

AZO DYES HAVING AN OPTIONALLY SUBSTITUTED 1-AZO-3-NITRO-4-ARYLAMINOPHENYL NUCLEUS

This application is a continuation of application Ser. No. 253,411, filed May 15, 1972 and now abandoned.

This invention relates to new water-soluble azo dyes. The invention provides azo compounds of formula I,

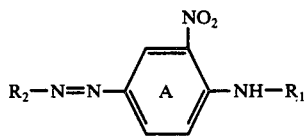

I in which
  $R_1$ signifies an aromatic or heterocyclic radical which may be substituted,
  $R_2$ has the same significances as $R_1$ or is the radical of a coupling component, for example, a radical of a coupling component bearing an active methylene group,
and the molecule contains 1 or 2 sulphonic groups, and the ring A may be further substituted.

The invention also provides a process for the production of compounds of formula I which comprises
  a. reacting an azo compound of formula II,

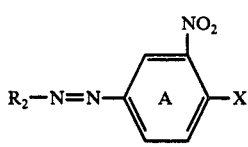

II in which
  $R_2$ and A are as defined above, and
  x signifies a radical replaceable by $R_1NH$—, in which $R_1$ is as defined above,
with an amino compound of formula III, $H_2N - R_1$  III in which $R_1$ is as defined above, or
  b. producing a compound of formula Ia,

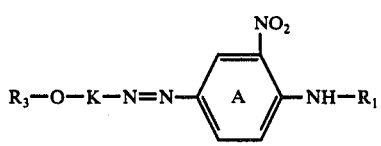

Ia in which
  $R_1$ and A are as defined above,
  $R_3$ signifies an alkyl, aryl or acyl radical which is unsubstituted or substituted, and
  K signifies a phenylene or naphthylene radical which is unsubstituted or substituted,
comprising etherifying or acylating a compund of formula IV,

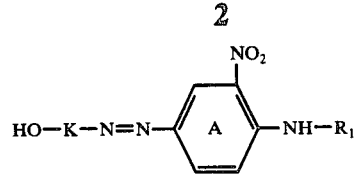

IV in which
  $R_1$, A and K are as defined above, with a compound of the formula $R_3$—$X_1$
in which
  $R_3$ is as defined above, and
  $x_1$ signifies halogen or a sulphate or halosulphate radical, or
  c. producing a compound of formula Ib,

K_1—N=N—A—NH—R_1

Ib in which
  $R_1$ and A are as defined above, and
  $K_1$ signifies a coupling component,
comprising coupling a diazo compound of an amine of formula VI,

H_2N—A—NH—R_1

VI in which $R_1$ and A are as defined above, with a coupling compound of formula VIII, $K_1 - H$  VIII in which $K_1$ is as defined above.

In process variant a) the reaction conditions are not particularly critical. The reaction is conducted preferably in an inert solvent. Examples of suitable solvents are dimethylformamide ethylene glycol, methanol, ethanol, isobutyl alcohol, N-methylperrolindone dimethyl sulphoxide and hexamethyl phosphoric amide.

The starting compounds of formula II contain a substituent X which can be replaced by the radical —NH—$R_1$. This radical X is preferably a halogen atom, e.g. chlorine or bromine, or an arylsulphonic acid ester or an alkoxy radical, especially a chlorine atom.

The reaction temperature is largely independent of the reactivity of the two components. Suitable temperatures are from 80° to 190° C, preferably from 100° to 130° C. The reaction can be carried out at atmospheric pressure or increased pressure. The compounds are normally employed in stoichiometric amounts.

When using the compounds of formula II in which X is an acid radical, it is preferred to carry out the reaction in the presence of an acid-binding agent. Examples of suitable acid-binding agents are sodium acetate, sodium carbonate, magnesium oxide, calcium carbonate and diethanolamine.

The preferred chloro compounds of formula II may be formed from the corresponding compounds containing hydroxyl groups by reaction with phosgene as described below. In this case it is not necessary to isolate the chloro compounds; provided the starting materials are well soluble, they can be reacted at once in the solvent with the selected amine to yield the new dyes of formula I.

Process variant (b) may 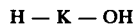carried out in water, if necessary with the addition of an organic solvent, preferably at a pH above 7 and in the presence of an agent for binding the $HX_1$ acid formed during the reaction, such as sodium hydroxide or sodium carbonate. A suitable temperature is from 40° to $\phi$° C, preferably from 50° to 70° C.

The coupling reaction of process variant (c) is carried out in conventional manner, as is described in the literature and known in the art.

The preferred unsubstituted or substituted aromatic significances for $R_1$ or $R_2$ are phenyl and naphthyl radicals, especially a phenyl radical, which may be substituted by radicals such as optionally substituted alkyl or alkoxy groups, arylsulphonyl or aryloxy groups, halogen atoms or carbalkoxy, sulphonic acid, carboxylamido, carboxylic acid or carboxylic ester groups. The alkyl substituents may be straight or branched, and preferably contain 1 to 12 for example 1 to 6 or especially 1 to 4 carbon atoms. Similarly the alkoxy radials are preferably of 1 to 4 carbon atoms. Preferred substituents for the alkyl radicals are halogen atoms or hydroxyl, cyano or aryl groups; in the latter case the radical is an aralkyl radical.

Preferred heterocyclic significances for $R_1$ and $R_2$ are saturated and unsaturated five- or six-membered rings, e.g. pyridine, pyrazolone, aminopyrazole, pyrrolidine, piperidine, mopholine, piperazine, pyrimidine, triazine, thiazole, benzothiazole and triazole.

Other significances for $R_1$ and $R_2$ include diphenyl oxide, diphenyl amine, diphenyl sulphoxide diphenyl sulphone or an azobenzene radical in which the benzene nucleus may be substituted as described above for the phenyl significances of $R_1$ and $R_2$.

The suitable coupling component significances for $R_2$ are well known in the art and may belong to various series, including the aromatic series, e.g. benzenes and naphthalenes bearing a substituent permitting coupling, such as amino- and hydroxy-benzenes or -naphthalenes; the heterocyclic series, e.g. pyrazolones and aminopyrazoles; the barbituric acid series; and the aliphatic series, e.g. alkanes, alkynes and alkines with a coupling methylene group, such as acylacetic arylamides, acylacetic alkylamides and malonic acid and malonic nitrile derivatives.

Especially preferred substituents in the ring A of the various formulae are alkyl, halogen, carboxylic acid and carboxylic ester groups.

Where "halogen" is a non-reactive substituent it signifies fluorine, iodine, or, preferably, chlorine or bromine.

Generally, preferred aryl substituents are phenyl and naphthyl, especially the former.

The intermediates of formula II may be formed by reacting the corresponding compounds in which X represents a hydroxyl group with phosgene in the presence of an organic amide, for example in accordance with French Pat. No. 1,439,301.

The azo compounds of formula IV may be formed by coupling a diazo compound from an amine of formula VI, as defined above, with a compound of formula VII,

H — K — OH VII in which K is as defined above.

Insofar as the production of the starting materials is not described, the compounds are known or may be prepared by known processes or in a manner analogous to known processes.

The invention particularly provides the azo dyes of formula Iz

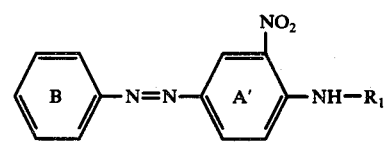

Iz in which $R_1$ is as defined above, and the aromatic ring A' is unsubstituted or substituted by alkyl, alkoxy, halogen, a carboxylic acid or carboxylic ester group and the aromatic ring B is unsubstituted or substituted. Suitable substituents for ring B include $SO_3H$, halogen, $NO_2$, optionally substituted alkyl, alkoxy, phenoxy, aryl, cycloalkyl, alkylsulphonyl, arylsulphonyl, an O-tosyl group, $CF_3$, $CCl_3$, an amino group which may be mono- or di-substituted, or a sulphonamide group of formula X,

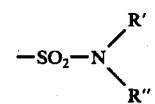

X in which R' and R" each signifies hydrogen or an optionally substituted hydrocarbon radical, such as alkyl, aryl or cycloalkyl radicals, especially alkyl of 1 to 4 carbon atoms, phenyl, naphthyl or cyclohexyl radicals.

The invention comprises in particular azo dyes of the following four formulae: Iy, Ix, Iw and Iv,

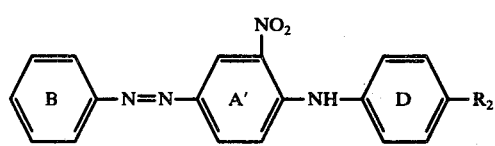

Iy in which the aromatic rings A' and B are as defined above, $R_2$ signifies hydrogen or a group of the formula

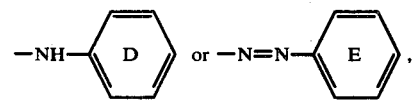

and the aromatic rings D and/or E and/or $E_1$ may be substituted by a group, preferably by only one group selected from an optionally substituted alkyl, alkoxy or aryl radical, $SO_3H$, halogen, nitro or an optionally substituted sulphoamide group of formula X,

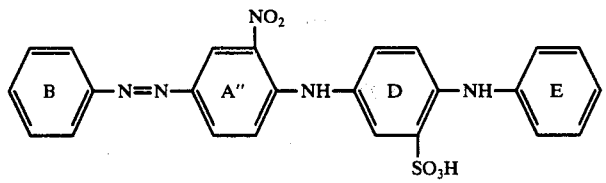

in which the aromatic ring A" bears no further substituents, and the rings B, D and E are as defined above;

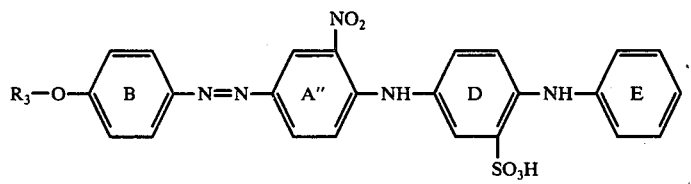

in which the rings A", B, D and E are as defined above, and $R_3$ signifies an optionally substituted alkyl or aryl radical or an optionally substituted acyl radical, e.g. a tosyl radical;

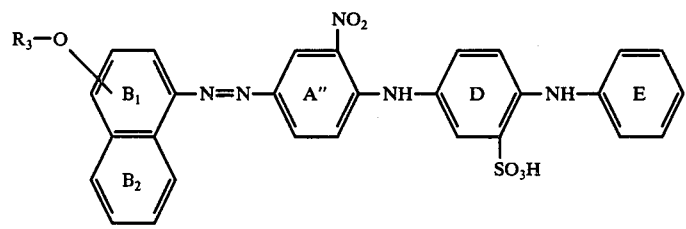

in which the aromatic rings $B_1$ and/or $B_2$ may be further substituted and the rings A", D and E and radical $R_3$ are as defined above. In the above formula the $R_3$—O-radical is preferably in the para position.

It is to be understood that in the various formulae the sulphonic acid groups are generally not shown. The position of such groups is not particularly important but it is preferred that the sulphonic acid group or groups are substituents of the radicals $R_2$ or $R_1$ and are not on the ring A. When two such groups are present they may be on the radicals $R_2$ and $R_1$ or may both be on the same radical.

U.S. Pat. No. 3,516,982 discloses some compounds similar to those of this invention, but they are water-insoluble disperse dyes and do not contain sulphonic acid groups.

The azo dyes of this invention may be used for dyeing and printing natural and synthetic polyamide fibres, natural and regenerated cellulosic fibres, and polypropylene fibres modified by the introduction of basic groups. They are also suitable for dyeing and printing paper and leather. On these substrates they give dyeings and prints of yellow to yellow-brown shade.

The dyes of formula I are generally applied from neutral to acid medium in the pH region of 2 to 7, preferably 4 to 5, and in the presence of an acid, e.g. an organic acid such as acetic or formic acid. The dyeings and prints obtained usually have good fastness to light and to wet treatments, for example washing, sea water, perspiration, acids, alkali, aldehydes, milling and potting, and, similarly, usually have good fastness to gas fumes and to rubbing. The dyes are readily soluble in water, show good level dyeing properties and good covering power on polyamide substrates of irregular affinity. They are applicable alone and in combination with other acid dyes, the combination dyeings thus produced showing comparably good light and wet fastness. The dyes are excellent components for ternary combination shades and show good power of build-up with other acid dyes. When dyed in combination with blue dyes, for example blue anionic anthraquinone dyes, they do not give rise to catalytic fading.

The dyes can be printed by conventional methods, for instance by the process described in U.S. Pat. No. 3,594,112.

The principal natural polyamide fibres are wool and silk. The synthetic polyamide fibres include those formed by condensation polymerization of ω-aminocarboxylic acid or their lactams, e.g. ω-laurin lactam, 11-undecanecarboxylic acid, 7-aminoenanthic acid or ε-caprolactam (polyamides 12, 11, 7 and 6); those from dibasic organic acids, e.g. dicarboxylic acids (adipic, sebacic acid) and diamines (hexamethylenediamine) (polyamides 66 and 610); and those formed by mixed polymerization, e.g. of ε-caprolactam, adipic acid and hexamethylenediamine (polyamide 66.6). The fibres may be in the form of yarn, woven fabric, knitted goods etc.

In the following Examples the parts and percentages are by weight and the temperatures in degrees centigrade. The parts by volume relate to the parts by weight as liters to kilograms.

EXAMPLE 1

In a four-necked sulphonation vessel fitted with stirrer, thermometer and reflux condenser, 75 parts of dimethylformamide are set for reaction with 5.38 parts of 4-amino-1,1'-diphenylamine-2-sulphonic acid and 7.77 parts of 4-chloro-3-nitro-4'-N,N-dimethylaminosulphonic amide-1,1'-azobenzene. After the addition of 1 part of magnesium oxide the mixture is heated to 100°-110° in 15 to 20 hours. It is allowed to cool, then the brownish mass is discharged into a mixture of 320 parts of water and 300 parts of iso-propanol. Potassium chloride is added to precipitate the dye, which is isolated by filtration, washed with saturated potassium chloride solution and dried at 60°-70°. The dye of the formula

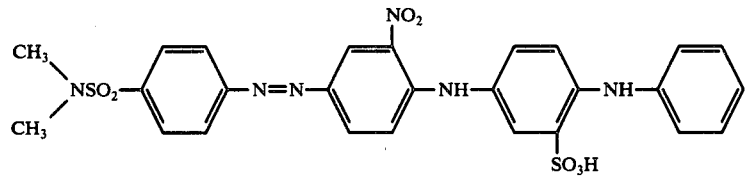

is obtained in the form of its potassium salt in a yield of 9 parts.

The following table shows the structural composition of further dyes which can be produced in analogy with the procedure of Example 1. These dyes correspond to the formula

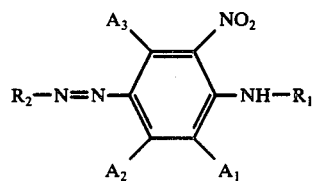

(a)

where $A_1$, $A_2$ and $A_3$, R and $R_1$ have the meanings assigned to them in the table. The shade of the dyeings is given by the dyes on nylon is noted in the final column.

Table

| Ex. No. | $R_2$ | $A_1$ | $A_2$ | $A_3$ | $R_1$ | Shade of dyeing on nylon |
|---|---|---|---|---|---|---|
| 2 | $C_2H_5O$—⟨⟩— | H | H | H | —⟨⟩—NH—⟨⟩— with $SO_3H$ | yellow-brown |
| 3 | ⟨⟩— | H | H | H | " | " |
| 4 | Cl—⟨⟩— | H | H | H | " | " |
| 5 | 2,4-Cl₂—⟨⟩— | H | H | H | " | " |
| 6 | $(C_2H_5)_2N$—$O_2S$—⟨⟩— | H | H | H | " | " |
| 7 | Cl—⟨⟩—O—⟨⟩— | H | H | H | " | " |
| 8 | o-$CH_3$—⟨⟩— | H | H | H | " | " |
| 9 | o-$OCH_3$—⟨⟩— | H | H | H | " | " |
| 10 | n-$C_4H_9$—⟨⟩— | H | H | H | " | " |
| 11 | $NH_2$—$O_2S$—⟨⟩— | H | H | H | " | " |
| 12 | $C_4H_9$—HN—$O_2S$—⟨⟩—$OCH_3$ | H | H | H | " | " |
| 13 | Cl—⟨⟩— | H | —$CH_3$ | H | " | " |

Table-continued

| Ex. No. | R₂ | A₁ | A₂ | A₃ | R₁ | Shade of dyeing on nylon |
|---|---|---|---|---|---|---|
| 14 | 2,4-Cl₂-C₆H₃- | H | " | H | " | " |
| 15 | (CH₃)₂N-SO₂-C₆H₄- | H | " | H | " | " |
| 16 | Cl-C₆H₄-O-C₆H₄- | H | " | H | " | " |
| 17 | H₂N-O₂S-C₆H₄- | H | " | H | " | " |
| 18 | 2-Cl-C₆H₄- | H | " | H | " | " |
| 19 | 2-OCH₃-C₆H₄- | H | " | H | " | " |
| 20 | C₆H₅- | H | —COOH | H | " | " |
| 21 | Cl-C₆H₄- | H | " | H | " | " |
| 22 | 2,4-Cl₂-C₆H₃- | H | " | H | " | " |
| 23 | (CH₃)₂N-SO₂-C₆H₄- | H | " | H | " | " |
| 24 | 2-SO₂NH₂-C₆H₄- | H | " | H | " | " |
| 25 | 2-CH₃-C₆H₄- | H | " | H | " | " |
| 26 | 2-OCH₃-C₆H₄- | H | " | H | " | " |
| 27 | n-C₄H₉-C₆H₄- | H | " | H | " | " |
| 28 | C₆H₅- | H | —COOCH₃ | H | " | " |
| 29 | Cl-C₆H₄- | H | " | H | " | " |
| 30 | 2,4-Cl₂-C₆H₃- | H | " | H | " | " |
| 31 | (CH₃)₂N-SO₂-C₆H₄- | H | " | H | " | " |
| 32 | NH₂-SO₂-C₆H₄- | H | " | H | " | " |
| 33 | Cl-C₆H₄- | H | " | H | " | " |
| 34 | " | H | " | H | -C₆H₄-N=N-C₆H₄-SO₃H | " |
| 35 | H₂N-SO₂-C₆H₄- | H | " | H | " | " |

Table-continued

| Ex. No. | $R_2$ | $A_1$ | $A_2$ | $A_3$ | $R_1$ | Shade of dyeing on nylon |
|---|---|---|---|---|---|---|
| 36 | 2,4-dichlorophenyl | H | " | H | " | " |
| 37 | phenyl | H | " | H | " | " |
| 38 | " | H | H | H | " | " |
| 39 | 4-chlorophenyl | H | H | H | " | " |
| 40 | 3-sulfamoylphenyl ($H_2N-O_2S-$) | H | H | H | " | " |
| 41 | " | H | —COOH | H | " | " |
| 42 | phenyl | H | " | H | " | " |
| 43 | 4-chlorophenyl | H | " | H | " | " |
| 44 | 4-sulfamoylphenyl ($H_2N-SO_2-$) | H | H | H | 3-methyl-4-(phenylamino)-benzenesulfonic acid derivative ($-C_6H_3(CH_3)(SO_3H)-NH-C_6H_5$) | " |
| 45 | " | H | —$CH_3$ | H | " | " |
| 46 | " | H | —$COOCH_3$ | H | " | " |
| 47 | " | Cl | H | H | " | " |
| 48 | 4-sulfamoylphenyl ($H_2N-O_2S-$) | H | H | " | " | " |
| 49 | " | H | H | H | $-C_6H_4-N=N-C_6H_4-SO_3H$ | " |
| 50 | " | H | H | H | 2-methoxy-sulfophenylamino derivative | " |
| 51 | " | H | H | H | $-C_6H_3(SO_3H)-NH-C_6H_4-NHCOCH_3$ | " |
| 52 | " | H | H | H | $-C_6H_4-NH-C_6H_3(NO_2)-SO_3H$ | " |
| 53 | 2-chlorophenyl | H | H | H | " | " |
| 54 | phenyl | H | H | H | " | " |
| 55 | 2,4-dichlorophenyl | H | H | H | " | " |
| 56 | 4-(dimethylsulfamoyl)phenyl ($(CH_3)_2N-O_2S-$) | H | H | H | " | " |
| 57 | 2-methylphenyl ($CH_3$) | H | H | H | " | " |
| 58 | 2-methoxyphenyl ($OCH_3$) | H | H | H | " | " |
| 59 | 4-(4-chlorophenoxy)phenyl ($Cl-C_6H_4-O-C_6H_4-$) | H | H | H | " | " |

Table-continued

| Ex. No. | R₂ | A₁ | A₂ | A₃ | R₁ | Shade of dyeing on nylon |
|---|---|---|---|---|---|---|
| 60 | 2,4-dimethyl-5-methylphenyl (H₃C—C₆H₂(CH₃)(CH₃)—) | H | H | H | phenyl-NH-phenyl-SO₃H | " |
| 61 | H₃C—C₆H₄—SO₂—O—C₆H₄— | H | H | H | " | " |
| 62 | C₆H₅—SO₂—O—C₆H₄— | H | H | H | " | " |
| 63 | HO₃S—C₃H₆—O—C₆H₄— | H | H | H | " | " |
| 64 | 2-methoxy-5-methylphenyl (OCH₃, CH₃ substituted) | H | H | H | " | " |
| 65 | 2-ethoxy-5-methylphenyl (O—C₂H₅, CH₃) | H | H | H | " | " |
| 66 | 2-(phenylsulfonyloxy)-5-methylphenyl (O—SO₂—C₆H₅, CH₃) | H | H | H | " | " |
| 67 | HO₃S—C₃H₆—O—C₆H₄— | H | H | H | —C₆H₄—NH—C₆H₅ | " |
| 68 | 3-methyl-4-methoxyphenyl (CH₃, H₃CO) | H | H | H | phenyl-NH-phenyl-SO₃H | " |
| 69 | C₂H₅—O—C₆H₃(CH₃)— | H | H | H | " | " |
| 70 | C₆H₅—SO₂—O—C₆H₃(CH₃)— | H | H | H | " | " |
| 71 | HO₃S—(CH₂)₃—O—C₆H₃(CH₃)— | H | H | H | —C₆H₄—NH—C₆H₅ | " |
| 72 | H₃CO—C₆H₃(CH₃)— | H | H | H | phenyl-NH-phenyl-SO₃H | " |
| 73 | C₂H₅O—C₆H₃(CH₃)— | H | H | H | " | " |
| 74 | C₆H₅—SO₂—O—C₆H₃(CH₃)— | H | H | H | " | " |
| 75 | C₆H₅—CO—O—C₆H₄— | H | H | H | " | " |
| 76 | C₆H₅—CO—O—C₆H₃(CH₃)— | H | H | H | " | " |
| 77 | HO₃S—C₆H₄— | H | H | H | —C₆H₄—NH—C₆H₅ | " |
| 78 | 3-SO₃H—C₆H₄— | H | H | H | " | " |

Table-continued

| Ex. No. | R₂ | A₁ | A₂ | A₃ | R₁ | Shade of dyeing on nylon |
|---|---|---|---|---|---|---|
| 79 | 2-(SO₃H)-phenyl | H | H | H | " | " |
| 80 | 4-(CH₃O)-phenyl | H | H | H | -C₆H₄-N=N-C₆H₄-SO₃H | " |
| 81 | 4-(C₂H₅O)-phenyl | H | H | H | " | " |
| 82 | 4-(C₆H₅-SO₂-O)-phenyl | H | H | H | " | " |
| 83 | 4-CH₃O-2-CH₃-phenyl | H | H | H | " | " |
| 84 | 4-C₂H₅O-2-CH₃-phenyl | H | H | H | " | " |
| 85 | 4-(C₆H₅-SO₂-O)-2-CH₃-phenyl | H | H | H | " | " |
| 86 | 4-CH₃O-3-CH₃-phenyl | H | H | H | " | " |
| 87 | 4-C₂H₅O-3-CH₃-phenyl | H | H | H | " | " |
| 88 | 4-(C₆H₅-SO₂-O)-3-CH₃-phenyl | H | H | H | " | " |
| 89 | 4-[HO₃S-(CH₂)₃O]-phenyl | H | H | H | -C₆H₄-N=N-C₆H₅ | " |
| 90 | 4-(HO₃S)-phenyl | H | H | H | " | " |
| 91 | 3-(SO₃H)-phenyl | H | H | H | " | " |
| 92 | 4-(CH₃O)-phenyl | H | H | H | -C₆H₄-NH-C₆H₃(OCH₃)(SO₃H) | " |
| 93 | 4-(C₂H₅O)-phenyl | H | H | H | " | " |
| 94 | 4-(C₆H₅-SO₂-O)-phenyl | H | H | H | " | " |
| 95 | 4-C₂H₅O-2-CH₃-phenyl | H | H | H | " | " |
| 96 | 4-(C₆H₅-SO₂-O)-3-CH₃-phenyl | H | H | H | " | " |
| 97 | 4-(CH₃O)-phenyl | H | H | H | -C₆H₄-NH-C₆H₃(NO₂)(SO₃H) | " |
| 98 | 4-(C₂H₅O)-phenyl | H | H | H | " | " |
| 99 | 4-(C₆H₅-SO₂-O)-phenyl | H | H | H | " | " |

Table-continued
| Ex. No. | R₂ | A₁ | A₂ | A₃ | R₁ | Shade of dyeing on nylon |
|---|---|---|---|---|---|---|
| 100 | 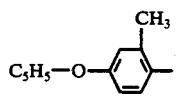 | H | H | H | " | " |
| 101 | 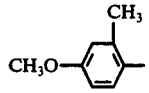 | H | H | H | " | " |
| 102 | 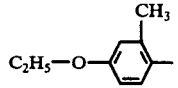 | H | H | H | " | " |
| 103 | 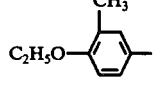 | H | H | H | " | " |
| 104 | 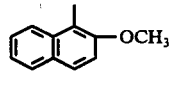 | H | H | H | 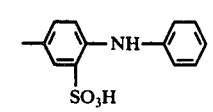 | " |
| 105 | 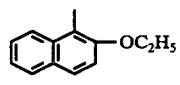 | H | H | H | " | " |
| 106 | 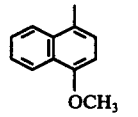 | H | H | H | " | " |
| 107 | 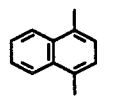 | H | H | H | " | " |
| 108 | 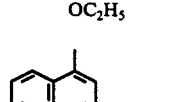 | H | H | H | " | " |
| 109 | 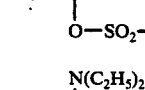 | H | H | H | " | " |
| 110 | 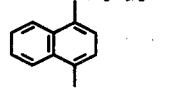 | H | H | H | 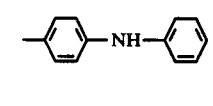 | " |
| 111 | 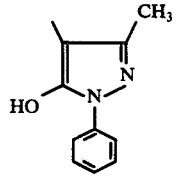 | H | H | H | 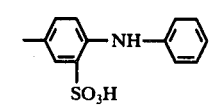 | " |
| 112 | 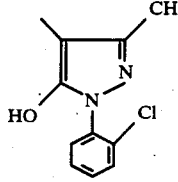 | H | H | H | " | " |

Table-continued

| Ex. No. | R₂ | A₁ | A₂ | A₃ | R₁ | Shade of dyeing on nylon |
|---|---|---|---|---|---|---|
| 113 | ![pyrazole with CH₃, HO, and 2,5-dichlorophenyl] | H | H | H | " | " |
| 114 | ![pyrazole with CH₃, H₂N, and phenyl] | H | H | H | " | " |
| 115 | CH₃CO—CH(—)—CO—NH—⟨phenyl⟩ | H | H | H | " | " |
| 116 | CH₃CO—CH(—)—CO—NH—⟨phenyl-Cl⟩ | H | H | H | " | " |
| 117 | CH₃CO—CH(—)—CO—NH—⟨phenyl-OCH₃⟩ | H | H | H | " | " |
| 118 | ⟨phenyl⟩—CO—CH(—)—CO—NH—⟨phenyl⟩ | H | H | H | " | " |

EXAMPLE 119

A mixture of 26.4 parts of 4-amino-1,1'-diphenylamine-2-sulphonic acid, 30 parts of 4-chloro-4'-methoxy-3-nitro-1,1'-azobenzene, 12 parts of sodium carbonate and 50 parts of dimethylformamide is reacted for 20 hours at 100°. Subsequently, the dimethylformanide is distilled under vacuum, the residue dissolved in hot water and the dye precipitated with potassium chloride, filtered, expressed and dried. The dye of the formula

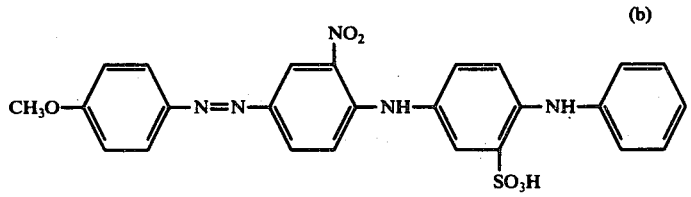

(b)

is obtained in its potassium salt form.

The intermediate used in the Example, 4-chloro-4'-methoxy-3-nitro-1,1'-azobenzene, can be produced as follows. 27.8 parts of 4-chloro-4'-hydroxy-3-nitro-1,1'-azobenzene are dissolved in 400 parts of water and 53 parts of 30% sodium hydroxide solution at 50°. In 30 minutes 40 parts of dimethyl sulphate are dropped in and further 30% sodium hydroxide solution added to maintain the pH at 11.5–12 while the temperature is held at 50°–60°. The precipitated compound is filtered and separated from unetherified monoazo compound by treatment with caustic-alkaline solution.

The tosylated intermediate of the formula

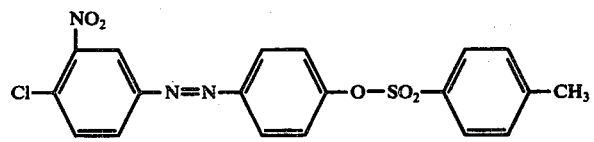

can be produced as follows. 27.8 parts of 4-chloro-4'-hydroxy-3-nitro-1,1'-azobenzene are dissolved in 400 parts of water with 15 parts of 30% sodium hydroxide solution at 80°. In 2 hours 38 parts of para-toluenesulfonyl chloride are added in portions, the pH being maintained at 9–10 by dropwise addition of 30% sodium hydroxide solution. On completion of the reaction the precipitated compound is isolated by filtration and washed with caustic-alkaline water. It can be reacted with 4-amino-1,1' -diphenylamine-2-sulphonic acid to form the dye of Example 61.

APPLICATION EXAMPLE A

A dyebath is set with 4000 parts of water, 10 parts of anhydrous sodium sulphate and 2 parts of the dye produced in Example 1. 100 parts of a previously wetted fabric of synthetic polyamide fibre are entered at 40°, then the bath is brought to the boil in 30 minutes and held at this temperature for 1 hour. At this point 4 parts of glacial acetic acid are added. Dyeing is continued for 30 minutes at the boil. The water lost by evaporation is continuously replaced during dyeing. In place of 4 parts of glacial acetic acid, ammonium or sodium sulphate can be used with equally good results. On removal from the bath the fabric is rinsed with water and dried. Wool can also be dyed by this method. The yellow-brown dyeings obtained have good light and wet fastness.

This method can be employed for dyeing polypropylene fibres modified by the introduction of basic groups, on which dyeings of comparable quality are obtained.

APPLICATION EXAMPLE B

A printing paste of the following composition is prepared:

| | |
|---|---|
| 30 | parts of the dye of Example 1, |
| 50 | parts of thiodiethylene glycol, |
| 500 | parts of 30% aqueous crystal gum solution, |
| 60 | parts of thiourea, |
| 60 | parts of 20% aqueous ammonium sulphate solution and |
| 300 | parts of water |
| 1000 | parts total |

The paste is printed on nylon fabric by one of the known methods and after intermediate drying the print is fixed for 30–45 minutes at 102°. This is followed by soaping at 60°, washing off and drying. A yellow-brown print with good fastness properties is obtained. Prints of similarly good quality are obtained when intermediate drying is omitted. This method can also be employed for printing wool and other natural polyamide fibres, the prints on these substrates having comparable good fastness properties.

What is claimed is:

1. A compound of the formula

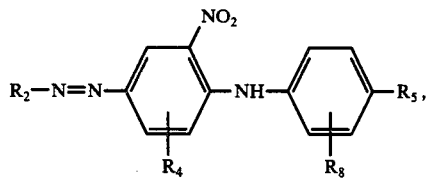

wherein $R_2$ is phenyl, substituted phenyl, naphthyl, substituted naphthyl, substituted phenoxyphenyl, anilinophenyl, substituted anilinophenyl, phenylsulfinylphenyl, substituted phenylsulfinylphenyl, substituted phenylsulfonylphenyl, phenylazophenyl, substituted phenylazophenyl or

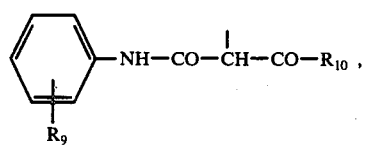

wherein each substituent of substituted phenyl, substituted naphthyl, substituted phenoxyphenyl, substituted anilinophenyl, substituted phenylsulfinylphenyl, substituted phenylsulfonylphenyl, and substituted phenylazophenyl is independently alkyl of 1 to 12 carbon atoms, alkyl of 1 to 12 carbon atoms substituted by halo, hydroxy, cyano, phenyl or naphthyl, alkoxy of 1 to 4 carbon atoms, sulfoalkoxy of 1 to 4 carbon atoms, phenylsulfonyl, naphthylsulfonyl, phenoxy, naphthyloxy, halo, nitro, alkoxycarbonyl wherein the alkoxy radical has 1 to 4 carbon atoms, sulfo, —$CONH_2$, carboxy, phenyl, naphthyl, cyclohexyl, alkylsulfonyl of 1 to 12 carbon atoms, phenylsulfonyloxy, p-tolylsulfonyloxy, benzoyloxy, trifluoromethyl, trichloromethyl,

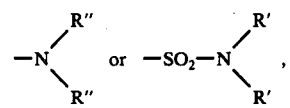

wherein $R_9$ is hydrogen, halo or alkoxy of 1 to 4 carbon atoms, $R_{10}$ is methyl or phenyl, each R′ is independently hydrogen, alkyl of 1 to 4 carbon atoms, phenyl, naphthyl or cyclohexyl, and each R″ is independently hydrogen or alkyl of 1 to 4 carbon atoms, $R_4$ is hydrogen, alkyl of 1 to 12 carbon atoms, alkoxy of 1 to 4 carbon atoms, halo, carboxy or alkoxycarbonyl wherein the alkoxy radical has 1 to 4 carbon atoms, $R_5$ is

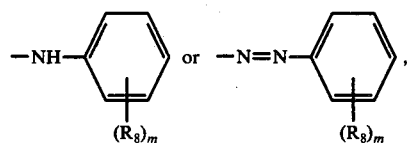

each $R_8$ is independently hydrogen acetamido, alkyl of 1 to 4 carbon atoms, alkyl of 1 to 4 carbon atoms substituted by halo, hydroxy, cyano, phenyl or naphthyl, alkoxy of 1 to 4 carbon atoms, phenyl, naphthyl, sulfo, halo, nitro or

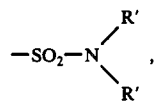

wherein each R′ is independently hydrogen, alkyl of 1 to 4 carbon atoms, phenyl, naphthyl or cyclohexyl, and m is 0, 1 or 2, wherein each halo is independently chloro, bromo, fluoro or iodo, with the proviso that the molecule contains 1 to 2 sulfo groups.

2. A compound according to claim 1 having the formula

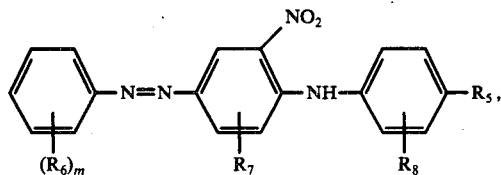

wherein $R_5$ is

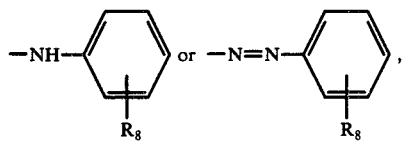

each
$R_6$ is independently sulfo, halo, nitro, alkyl of 1 to 4 carbon atoms, alkyl of 1 to 4 carbon atoms substituted by halo, hydroxy, cyano, phenyl or naphthyl, alkoxy of 1 to 4 carbon atoms, sulfoalkoxy of 1 to 4 carbon atoms, phenoxy, chlorophenoxy, phenyl, naphthyl, cyclohexyl, alkylsulfonyl of 1 to 4 carbon atoms, phenylsulfonyl, naphthylsulfonyl, phenylsulfonyloxy, p-tolylsulfonyloxy, benzoyloxy, trifluoromethyl, trichloromethyl, $NH_2$ or

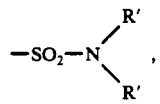

wherein each R' is independently hydrogen, alkyl of 1 to 4 carbon atoms, phenyl, naphthyl or cyclohexyl,
$R_7$ is hydrogen alkyl of 1 to 4 carbon atoms, alkoxy of 1 to 4 carbon atoms, halo, carboxy or alkoxycarbonyl wherein the alkoxy radical has 1 to 4 carbon atoms,
each $R_8$ is independently hydrogen, alkyl of 1 to 4 carbon atoms, alkyl of 1 to 4 carbon atoms substituted by halo, hydroxy, cyano, phenyl or naphthyl, alkoxy of 1 to 4 carbon atoms, phenyl, naphthyl, sulfo, halo, nitro or

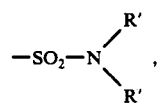

wherein each R' is independently hydrogen, alkyl of 1 to 4 carbon atoms, phenyl, naphthyl or cyclohexyl, and
$m$ is 0, 1 or 2.

3. A compound according to claim 2 wherein each $R_6$ is independently sulfo, halo, nitro, alkyl of 1 to 4 carbon atoms, alkyl of 1 to 4 carbon atoms substituted by halo, hydroxy, cyano, phenyl or naphthyl, alkoxy of 1 to 4 carbon atoms, sulfoalkoxy of 1 to 4 carbon atoms, phenoxy, chlorophenoxy, phenyl, naphthyl, alkylsulfonyl of 1 to 4 carbon atoms, phenylsulfonyl, naphthylsulfonyl, phenylsulfonyloxy, p-tolylsulfonyloxy, benzoyloxy, trifluoromethyl, trichloromethyl, $NH_2$ or $-SO_2-N\begin{matrix}R'\\R'\end{matrix}$, wherein
each R' is independently hydrogen, alkyl of 1 to 4 carbon atoms, phenyl, naphthyl or cyclohexyl, and
$R_7$ is hydrogen, alkyl of 1 to 4 carbon atoms, alkoxy of 1 to 4 carbon atoms, halo, carboxy or methoxycarbonyl.

4. A compound according to claim 2 having the formula

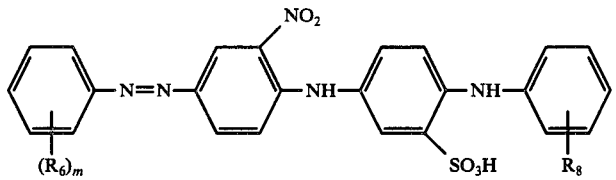

5. A compound according to claim 4 wherein each $R_6$ is independently sulfo, halo, nitro, alkyl of 1 to 4 carbon atoms, alkyl of 1 to 4 carbon atoms substituted by halo, hydroxy, cyano, phenyl or naphthyl, alkoxy of 1 to 4 carbon atoms, sulfoalkoxy of 1 to 4 carbon atoms, phenoxy, chlorophenoxy, phenyl, naphthyl, alkylsulfonyl of 1 to 4 carbon atoms, phenylsulfonyl, naphthylsulfonyl, phenylsulfonyloxy, p-tolylsulfonyloxy, benzoyloxy, trifluoromethyl, trichloromethyl, $NH_2$ or $-SO_2-N\begin{matrix}R'\\R'\end{matrix}$, wherein each R' is independently hydrogen, alkyl of 1 to 4 carbon atoms, phenyl, naphthyl or cyclohexyl.

6. A compound according to claim 1 having the formula

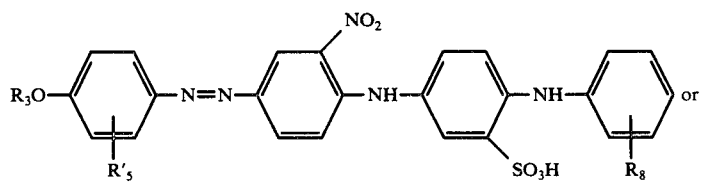

-continued

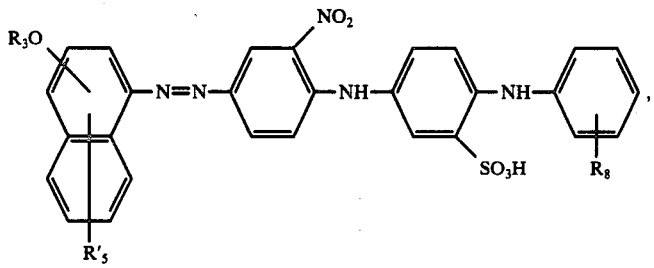

wherein
R₃ is alkyl of 1 to 4 carbon atoms, sulfoalkyl of 1 to 4 carbon atoms, phenyl, chlorophenyl, phenylsulfonyl, p-tolylsulfonyl or benzoyl,
R'₅ is hydrogen, sulfo, nitro, halo, alkyl of 1 to 4 carbon atoms, alkyl of 1 to 4 carbon atoms substituted by halo, hydroxy, cyano, phenyl or naphthyl, alkoxy of 1 to 4 carbon atoms, sulfoalkoxy of 1 to 4 carbon atoms, phenoxy, chlorophenoxy, phenyl, naphthyl, cyclohexyl, alkylsulfonyl of 1 to 4 carbon atoms, phenylsulfonyl, naphthylsulfonyl, phenylsulfonyloxy, p-tolylsulfonyloxy, benzoyloxy, trifluoromethyl, trichloromethyl, NH₂ or

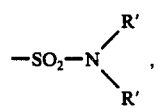

wherein each R' is independently hydrogen, alkyl of 1 to 4 carbon atoms, phenyl, naphthyl or cyclohexyl,
R₈ is hydrogen, alkyl of 1 to 4 carbon atoms, alkyl of 1 to 4 carbon atoms substituted by halo, hydroxy, cyano, phenyl or naphthyl, alkoxy of 1 to 4 carbon atoms, phenyl, naphthyl, sulfo, halo, nitro or

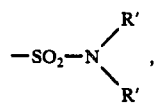

wherein each R' is independently hydrogen, alkyl of 1 to 4 carbon atoms, phenyl, naphthyl or cyclohexyl.

7. A compound according to claim 6 having the formula

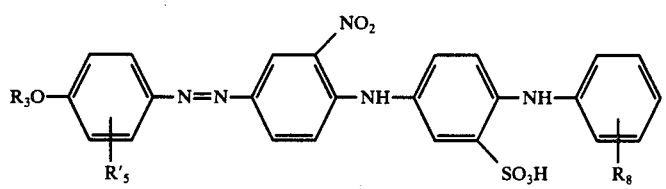

8. A compound according to claim 7 wherein
R'₅ is hydrogen, sulfo, nitro, halo, alkyl of 1 to 4 carbon atoms, alkyl of 1 to 4 carbon atoms substituted by halo, hydroxy, cyano, phenyl or naphthyl, alkoxy of 1 to 4 carbon atoms, sulfoalkoxy of 1 to 4 carbon atoms, phenoxy, chlorophenoxy, phenyl, naphthyl, alkylsulfonyl of 1 to 4 carbon atoms, phenylsulfonyl, naphthylsulfonyl, phenylsulfonyloxy, p-tolylsulfonyloxy, benzoyloxy, trifluoromethyl, trichloromethyl, NH₂ or

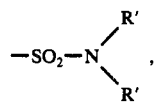

wherein each R' is independently hydrogen, alkyl of 1 to 4 carbon atoms, phenyl, naphthyl or cyclohexyl.

9. A compound according to claim 8 wherein
R₃ is alkyl of 1 to 4 carbon atoms, sulfoalkyl of 1 to 4 carbon atoms, chlorophenyl, phenylsulfonyl, p-tolylsulfonyl or benzoyl,
R'₅ is hydrogen or alkyl of 1 to 4 carbon atoms, and R₈ is hydrogen.

10. A compound according to claim 9 wherein R'₅ is hydrogen or methyl.

11. A compound according to claim 6 having the formula

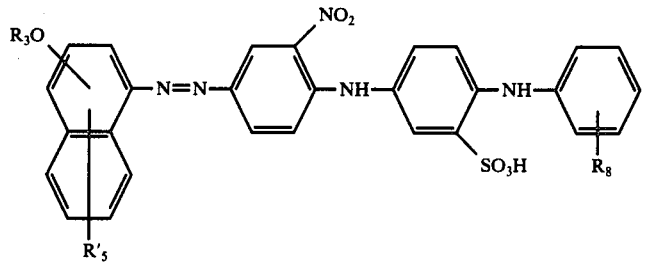

12. A compound according to claim 11 wherein
$R_3$ is alkyl of 1 to 4 carbon atoms or phenylsulfonyl,
$R'_5$ is hydrogen, and
$R_8$ is hydrogen.

13. A compound according to claim 12 wherein $R_3$ is methyl, ethyl or phenylsulfonyl.

14. A compound according to claim 1 having the formula

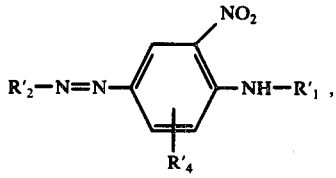

wherein
$R'_1$ is 4-anilinophenyl, 4-anilino-3-sulfophenyl, 3-methoxy-4-(2-sulfoanilino)phenyl, 4-(4-acetamidoanilino)-3-sulfophenyl, 4-(2-nitro-4-sulfoanilino)-phenyl, 4-phenylazophenyl or 4-(4-sulfophenylazo)-phenyl,
$R'_2$ is phenyl, substituted phenyl, monosubstituted naphthyl or

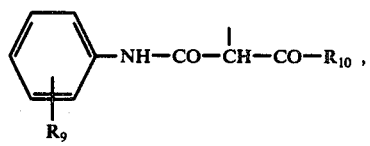

wherein substituted phenyl has 1 or 2 substituents and each substituent is independently alkyl of 1 to 4 carbon atoms, alkoxy of 1 to 4 carbon atoms, sulfoalkoxy of 1 to 4 carbon atoms, sulfo, halo, chlorophenoxy, phenylsulfonyloxy, p-tolylsulfonyloxy, benzoyloxy or

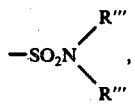

wherein each R''' is independently hydrogen or alkyl of 1 to 4 carbon atoms,
the substituent of monosubstituted naphthyl is alkoxy of 1 to 4 carbon atoms, sulfoalkoxy of 1 to 4 carbon atoms, phenylsulfonyloxy or diethylamino,
$R_9$ is hydrogen, halo or alkoxy of 1 to 4 carbon atoms, and
$R_{10}$ is methyl or phenyl, and
$R'_4$ is hydrogen, alkyl of 1 to 4 carbon atoms, halo, carboxy or alkoxycarbonyl wherein the alkoxy radical has 1 to 4 carbon atoms.

15. A compound according to claim 14 wherein
$R'_2$ is phenyl, substituted phenyl, monosubstituted naphthyl or

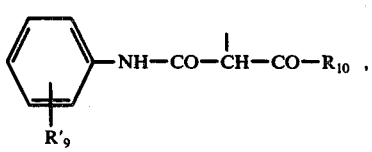

wherein substituted phenyl has 1 or 2 substituents and each substituent is independently alkyl of 1 to 4 carbon atoms, methoxy, ethoxy, 3-sulfopropoxy, sulfo, chloro, 4-chlorophenoxy, phenylsulfonyloxy, p-tolylsulfonyloxy, benzoyloxy or

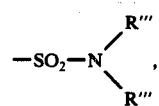

wherein each R''' is independently hydrogen or alkyl of 1 to 4 carbon atoms,
the substituent of monosubstituted naphthyl is methoxy, ethoxy, 3-sulfopropoxy, phenylsulfonyloxy or diethylamino,
$R'_9$ is hydrogen, chloro or methoxy, and
$R_{10}$ is methyl or phenyl, and
$R'_4$ is hydrogen, methyl, chloro, carboxy or methoxycarbonyl.

16. A compound according to claim 15 wherein
$R'_2$ is phenyl or substituted phenyl having 1 to 2 substituents wherein each substituent is independently alkyl of 1 to 4 carbon atoms, methoxy, ethoxy, 3-sulfopropoxy, sulfo, chloro, 4-chlorophenoxy, phenylsulfonyloxy, p-tolylsulfonyloxy, benzoyloxy or

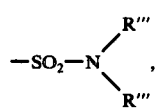

wherein each R''' is independently hydrogen or alkyl of 1 to 4 carbon atoms, and
$R'_4$ is hydrogen.

17. A compound according to claim 15 having the formula

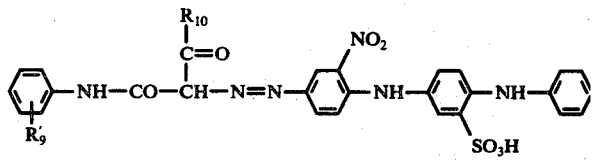

wherein
$R'_9$ is hydrogen, chloro or methoxy, and
$R_{10}$ is methyl or phenyl.

18. The compound according to claim 16 having the formula

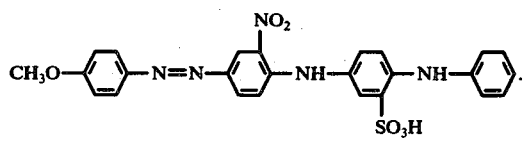

19. The compound according to claim 16 having the formula

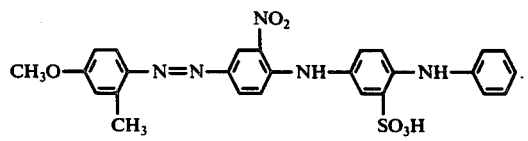

20. The compound according to claim 16 having the formula

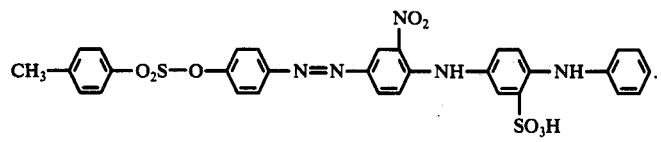
21. The compound according to claim 16 having the formula
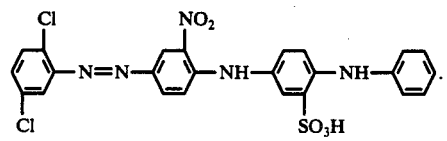
22. The compound according to claim 16 having the formula
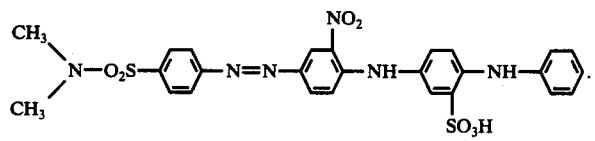
23. The compound according to claim 16 having the formula
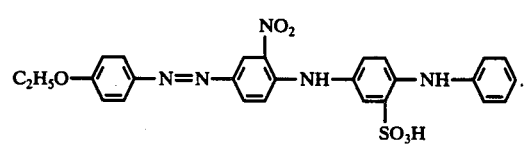
24. The compound according to claim 16 having the formula
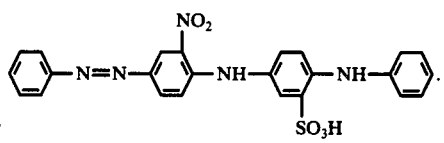
25. The compound according to claim 16 having the formula
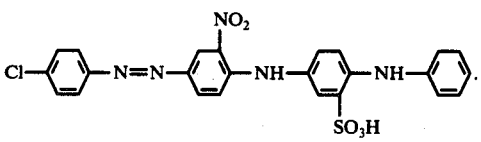
* * * * *